3,791,970
SOLID LUBRICANT
Irvin L. Tubb, San Diego, Calif., assignor to General Dynamics Corporation, San Diego, Calif.
No Drawing. Filed July 24, 1972, Ser. No. 274,529
Int. Cl. C10m 7/16, 7/44
U.S. Cl. 252—12                    2 Claims

ABSTRACT OF THE DISCLOSURE

A lubricant in solid form at room temperature comprising 1-hexadecanol (cetyl alcohol) tricresyl phosphate is disclosed. The lubricant is ordinarily used in cast stick, cake or tube form and is either applied to a surface by rubbing the end of the stick on the surface to be lubricated or the tool is coated by inserting it in the lubricant. This lubricant has been found to be highly effective for use with metal working drills, saws, etc. The lubricant is not brittle and adheres to surfaces without powdering. It also exhibits improved lubricity.

BACKGROUND OF THE INVENTION

This invention relates to lubricants and more particularly to solid lubricants useful with metal working tools.

Lubricants of various sorts have long been used in machining and metal working operations. Typically, lubricants are applied to drills, mills, saw blades, etc., which are used in cutting and shaping metal or other materials. The lubricant is intended to reduce tool wear and improve the finish and quality of the work. A good lubricant will reduce friction, help dissipate heat generated, and be fire retarditive.

In some operations, such as high speed lathe or milling machine operations, a continuous stream of cutting oil may be applied directly against the cutting tool to both lubricate and carry away excess heat. However, in many applications the highly fluid oil is undesirable. Means must be provided to collect and recycle the oil, limiting portability of the tooling. Rapidly turning tools tend to throw off oil by centrifugal force, contaminating the surrounding area. This contamination may be a serious detriment where the oil may adversely affect the article being machined, such as where holes are to be drilled in a composite including organic resins.

Attempts have been made to use solid paraffinic lubricants which are periodically rubbed on the tooling. While this has eliminated some contamination, these materials tend to be relatively brittle and tend to "powder" when brought into contact with moving tools. Little transfer of lubricant to the tool surface takes place where the lubricant has disintegrated into a powder. Also, the powdered lubricant may contaminate the articles being machined or the surrounding area. Further, the powdered material, if allowed to accumulate in a machining area, may constitute a fire hazard.

Thus, there is a continuing need for improved lubricants for use with metal working tools.

It is, therefore, an object of this invention to provide a lubricant which overcomes the above noted problems.

Another object of this invention is to provide a solid lubricant which may be applied to moving tools without powdering.

Still another object of this invention is to provide an improved system for lubricating tools which does not decrease tool portability.

A further object of this invention is to provide an improved lubricant for metal working tools which substantially eliminates contamination of articles being machined.

SUMMARY OF THE INVENTION

The above objects, and others, are accomplished in accordance with this invention by a lubricant which comprises 1-hexadecanol (cetyl alcohol) and tricresyl phosphate. This material is a solid at room temperature. The material may be formed in any suitable configuration, such as sticks, tubes, blocks, or in cups. The material may be applied to a still or moving tool, such as a drill, mill or saw blade, by merely rubbing it thereagainst. A thin film of high lubricity is transferred to the tool without any significant fracture or powdering of the lubricant body.

While good results are obtained with from about 2 to 50 weight percent tricresyl phosphate, the best combination of lubricity and physical characteristics is generally obtained with from about 35 to 50 weight percent tricresyl phosphate and 50 to 65 weight percent 1-hexadecanol. Of course, other ingredients may be added, where suitable, to improve any significant physical characteristics of the lubricant. For example, a dye or pigment might be added to intensify the color of the lubricant, so that a user may more easily judge lubricant film thicknesses.

Details of several preferred embodiments of the lubricant of this invention are described in the following examples. All parts and percentages are by weight, unless otherwise indicated.

Example I

About 500 grams of commercial grade cetyl alcohol (1-hexadecanol), available from the Bateman Company, is heated to about 60° C., about 10% above its melting point. About a 300-gram portion is poured into a container and allowed to cool to room temperature and solidify. About 200 grams of tricresyl phosphate, available from the Monsanto Corporation under the "Phosilex TCP" trademark, is added to the remaining 200-gram 1-hexadecanol portion with stirring. The resulting blend is then poured into a second container and allowed to cool and solidify. A ¼-inch drill bit mounted in a conventional hand drill is used to drill a series of holes in an aluminum structure. Periodically, the dill bit is inserted into the 1-hexadecanol in the first container to lubricate the bit. The lubricant is found to fracture and powder severely, with little transfer of the material to the drill bit. A second series of holes is then drilled, during which the drill bit is inserted into the blend in the second container. No powdering or other breakdown of the lubricant now occurs. A uniform film of adhering lubricant is found to form on substantially the entire drill surface during each insertion. The holes are found to be more easily drilled, the drill appears to operate at a lower temperature and more holes can be drilled between drill-resharpening or replacement than with the straight 1-hexadecanol.

Example II

About 600 grams of 1-hexadecanol, available under the trade name Alfol 16 from the Conoco Oil Company is dissolved in about 1,000 ml. methanol. About half of the solution is poured into a first cylindrical mold having a diameter of about 1 inch, and the methanol is allowed to evaporate. About 230 grams of tricresyl phosphate, available under the trademark "Lindol 179A" from the Stouffer Chemical Company, is mixed with the remaining half of the solution. This mixture is poured into a second 1-inch diameter cylindrical mold and the methanol is allowed to evaporate. Each mold is maintained at about 45° C. to speed solvent removal. After solidification, the two cylindrical sticks are cooled to room temperature and removed from the molds. Each stick is then used to lubricate a saw blade being used to saw composite panels which comprise aluminum skins with a urethane foam core. As a further comparison, Finch Paint 999–50, a liquid lubricant, is also used. Attempts to transfer the straight 1-hexadecanol to the blade are largely unsuccessful due to crumbling and powdering of the material. The liquid 999–50 is applied to a second saw blade with a brush. When the saw is operated at the desired speed, the lubricant is rapidly lost, being thrown off the saw teeth by centrifugal force. The lubricant contaminates the entire area and tends to coat the work piece, having a possible deleterious effect on the foam panel core. The blended lubricant applied to a third blade is found to transfer easily without powdering and to form a uniform thin film on the saw blade. With the blended lubricant, the saw and the panel being worked remain cooler and the saw blade is found to require less resharpening. The quality of the saw cut is also improved.

Example III

About 200 grams of 1-hexadecanol, available as technical grade cetyl alcohol from the Monsanto Corporation is heated to about 55° C. About 180 grams of tricresyl phtosphate, available from the Hess Oil and Chemical Corporation, and about 3 grams of Locarno Red X–1686, 1-(4'-methyl-5'-chloro-2'-sulfonic acid) azabenzene-2-hydroxy-3-naphthoic acid, a red dye available from American Cyanamide, are mixed thoroughly into the molten 1-hexadecanol. The blend is poured into a 0.5-inch diameter tubular mold and cooled to room temperature, solidifying the blended lubricant. The resulting solid waxy stick is removed and pressed against moving saws and drills being used in machining titanium. The bright red color of the lubricant makes applying uniform layers to the entire tool surface easy and convenient. The stick does not crumble and the lubricating film is found to be highly effective.

While certain specific proportions of ingredients, blending techniques and applications of the lubricant of this invention were described in the above examples, these may be varied where suitable with similar results. Other ingredients may be added to this lubricant to enhance or otherwise modify its properties. For example, a colorant may be added to assist users in judging lubricant film thicknesses.

Other modifications, ramifications and applications of the lubricant will occur to those skilled in the art upon reading this disclosure. These are intended to be included within the scope of this invention, as defined in the appended claims.

What is claimed is:

1. A solid lubricant—for application to metal machining tools—comprising from about 2 to about 60 weight percent tricresyl phosphate and from about 40 to about 98 weight percent 1-hexadecanol, substantially uniformly intermixed.

2. The solid lubricant according to claim 1, wherein said tricresyl phosphate makes up from about 35 to about 50 weight percent of said mixture, the balance consisting essentially of 1-hexadecanol.

References Cited

UNITED STATES PATENTS

| | | | |
|---|---|---|---|
| 3,252,909 | 5/1966 | Jenks | 252—12 |
| 3,507,677 | 4/1970 | Maynard et al. | 252—12 |

DANIEL E. WYMAN, Primary Examiner

I. VAUGHN, Assistant Examiner